No. 811,330. PATENTED JAN. 30, 1906.
E. ROTH.
PRESSURE AND SUCTION DEVICE.
APPLICATION FILED MAY 6, 1904.
2 SHEETS—SHEET 1.
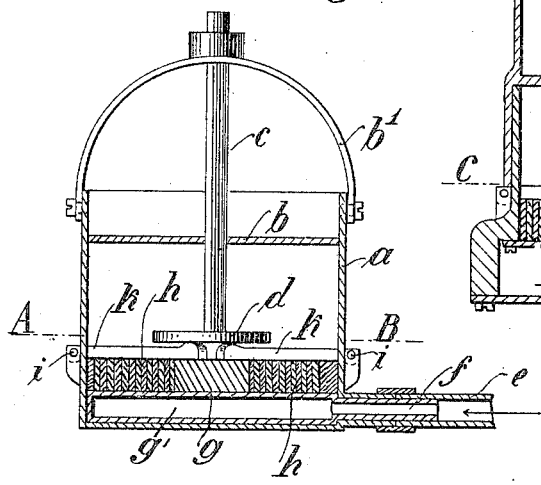
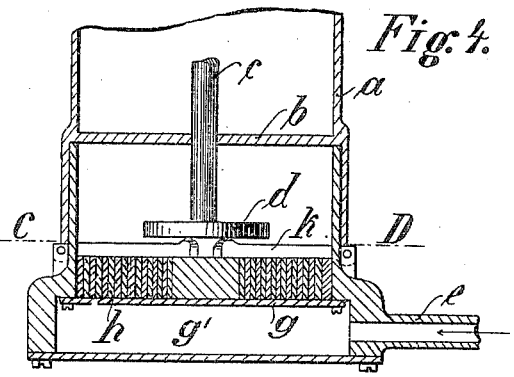
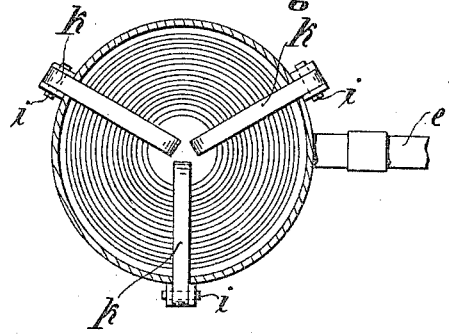
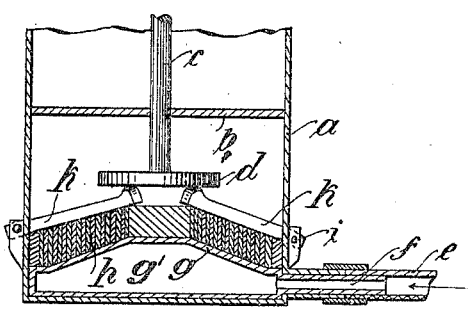
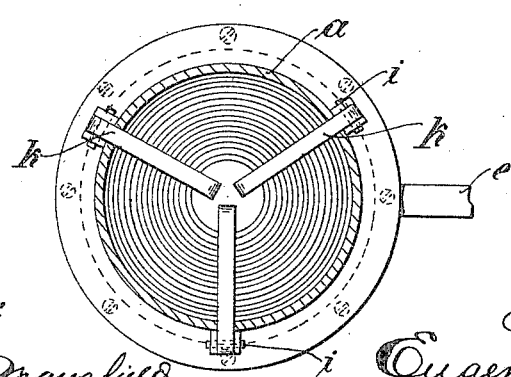
Witnesses:
James R. Mansfield
L. E. Witham
Inventor:
Eugen Roth
By his Attorneys.
Alexander & Dowell

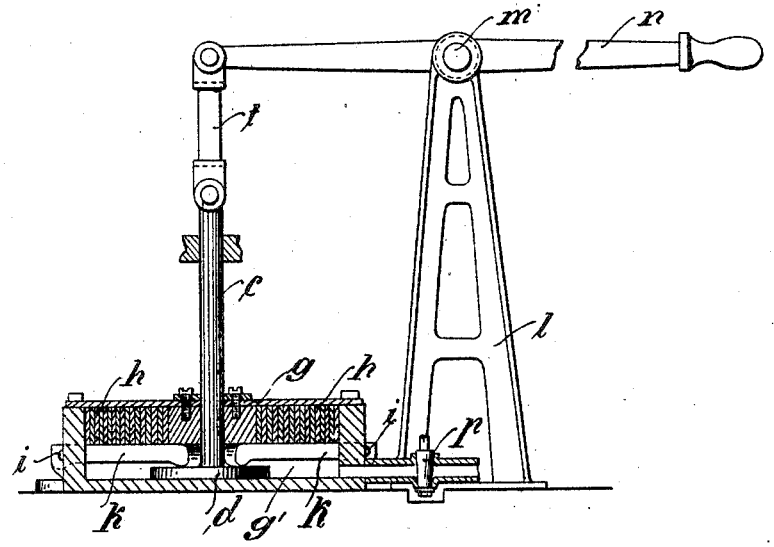
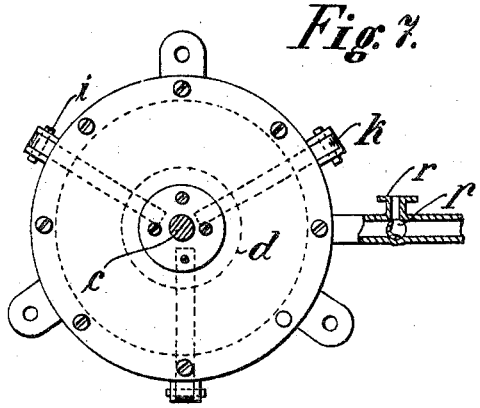

UNITED STATES PATENT OFFICE.

EUGEN ROTH, OF SCHÖNEBERG, NEAR BERLIN, GERMANY.

PRESSURE AND SUCTION DEVICE.

No. 811,330.      Specification of Letters Patent.      Patented Jan. 30, 1906.

Application filed May 6, 1904. Serial No. 206,759.

*To all whom it may concern:*

Be it known that I, EUGEN ROTH, engineer, a subject of the King of Prussia, German Emperor, residing at Schöneberg, near Berlin, in the Kingdom of Prussia, Germany, have invented certain new and useful Improvements in Pressure and Suction Devices, of which the following is a specification.

The present invention is an improvement in pneumatic pressure or suction devices; and its object is to prevent rupture of the flexible or resilient diaphragms, bladders, or rubber balls.

According to the present invention a flexible diaphragm, bladder, or rubber ball is suitably reinforced by yielding metal walls which permit any desired deformation of the yielding or elastic wall or diaphragm, while effectually preventing rupture thereof.

The accompanying drawings illustrate some forms of construction embodying the invention.

Figure 1 is a vertical section through a pressure device embodying the present invention, but deflated. Fig. 2 is a section on the line A B of Fig. 1. Fig. 3 corresponds to the lower part of Fig. 1, but shows the parts inflated. Fig. 4 is a view similar to Fig. 1 of a modified construction. Fig. 5 is a section on the line C D of Fig. 4. Fig. 6 represents a sectional elevation of a suction device embodying the invention. Fig. 7 illustrates a plan view of part of the apparatus shown in Fig. 6.

In the cylinder $a$, Figs. 1 and 2, is a rod $c$, which can be slid up and down through the guides $b$ $b'$. On the lower end of rod $c$ is disk $d$, which bears upon radially-arranged levers $k$, pivoted at their outer ends, as at $i$. These levers rest upon a nest of spirals or rings $h$, which are arranged above an air-chamber $g'$ in the lower end of the cylinder and restrict the movement of the upper wall or diaphragm $g$ of such chamber. The inlet-tube $f$ of chamber $g'$ is connected to a pipe $e$.

If now, for example, compressed air is forced into the chamber $g'$ through the pipe $e$ and the tube $f$, the upper wall of the chamber becomes deformed, as shown in Fig. 3—that is to say, the diaphragm becomes inflated and its middle point experiences the greatest deformation. The rings $i$ move with the diaphragm and reinforce it on all sides. As shown in Figs. 1 and 2, a bladder or rubber bag is placed in chamber $g'$; but only the upper part $g$ thereof is effected, as the remaining parts cannot widen out, because they are surrounded by fixed walls. The rings $h$ raise the levers $k$ and through them the disk $d$ and rod $c$.

If the compressed air is forced through the pipe $e$ into the chamber $g'$ through a non-return valve (not shown) to prevent its escape backward, the diaphragm $g'$ may be subjected to the greatest pressure without breaking or tearing and the rod $c$ can be moved upward with great force.

The motion of the rod $c$ can be utilized for the various purposes requiring force—for example, to open or close a door or for driving a motor, &c.

In the construction shown in Figs. 4 and 5 an elastic and flexible diaphragm $g$ is employed to form only the top of the chamber $g'$.

Figs. 6 and 7 show the invention as adapted for use as a vacuum-pump. In this case the disk $d$ and rings $h$ are located in the chamber $g'$ below the diaphragm $g$, the rod $c$ passing therethrough. The levers $k$ are also arranged in the chamber $g$ above disk $d$ and support the rings $h$. A two-armed lever $n$, pivoted at $m$ on the standard $l$, is connected by the link $t$ to rod $c$, so the latter can be raised so as to elevate the levers $k$ and rings $h$, so as to distort the diaphragm $g$ and enlarge the chamber $g'$. The chamber $g'$ may be closed completely air-tight, as by valve $p$, Fig. 7, so that upon raising the diaphragm $g$ the air in chamber $g'$ is rarefied. The chamber $g'$ may be connected through the pipe $r$ to any device which is to be exhausted of air.

By the described construction an extremely simple reliable air-pump can be produced free from the defects of the ordinary air-pumps—namely, the inability to keep the piston air-tight in the cylinder. In the constructions represented in Figs. 1 to 5 no piston-packings are necessary and the consequent frictional resistances are avoided.

What I claim, and desire to secure by Letters Patent of the United States, is—

1. In combination, a cylinder, an air-chamber therein, an elastic diaphragm in said cylinder, a nest of rings contacting the diaphragm, and levers contacting said rings, substantially as described.

2. In an apparatus of the character specified, the combination of an air-chamber having a yielding flexible diaphragm, and a nested series of devices fitting to and movable with said diaphragm, adapted to prevent rupture thereof, substantially as described.

3. In an apparatus of the character described, an air-tight chamber having a yielding wall, and devices conformable to and movable with said wall, but preventing disruption thereof; with levers contacting said devices and a reciprocatory rod operated by the levers, substantially as described.

4. In an apparatus of the character described, an air-tight chamber having an elastic flexible wall, and a series of devices conforming to and movable with said wall, to prevent disruption thereof; with levers contacting said devices, a reciprocatory rod, and an operative connection between the rod and levers, substantially as described.

5. In an apparatus of the character specified, the combination of an air-chamber having a yielding flexible diaphragm, and a nested series of devices fitting to and movable with said diaphragm, adapted to prevent rupture thereof; with a reciprocatory rod, and a disk thereon actuated by said devices, substantially as described.

6. In an apparatus of the character specified, the combination of an air-chamber having a flexible diaphragm, and devices fitting to and movable with said diaphragm, adapted to prevent rupture thereof; with radially-arranged levers contacting said devices, a reciprocatory rod, and a disk thereon contacting the free ends of said levers, substantially as described.

7. In combination, a cylinder, an air-chamber therein, a flexible diaphragm within said cylinder closing said chamber, a series of devices contacting said diaphragm, levers contacting said devices, a reciprocatory rod, and a disk on the inner end of said rod contacting said levers, all substantially as and for the purpose described.

8. In combination, a cylinder, an air-chamber at the bottom thereof, an elastic diaphragm within said cylinder closing said chamber, a nested series of rings contacting said diaphragm, a radial series of levers contacting said rings, a reciprocatory rod, and a disk on the inner end of said rod contacting said levers, all substantially as and for the purpose described.

In testimony whereof I have hereunto set my hand in presence of two subscribing witnesses.

EUGEN ROTH.

Witnesses:
EMIL PAPENBRUCH.
HENRY HASPER.